United States Patent Office 3,536,686
Patented Oct. 27, 1970

3,536,686
PROCESS FOR PREPARING HIGHLY CRYSTAL-
LINE POLYOLEFINS AND POLYMERIZATION
CATALYSTS THEREFOR
Juntaro Sasaki, Iwakuni-shi, Shigeru Wada, Ohtake-shi, and Tadao Iwata and Hidesaburo Oi, Iwakuni-shi, Japan, assignors to Mitsui Petrochemical Industries, Ltd., Tokyo, Japan, a corporation of Japan
No Drawing. Filed Dec. 18, 1967, Ser. No. 691,190
Claims priority, application Japan, Dec. 23, 1966, 41/83,898, 41/83,899; July 25, 1967, 42/47,386
Int. Cl. C08f 1/42, 3/10
U.S. Cl. 260—88.2
12 Claims

ABSTRACT OF THE DISCLOSURE

Process for preparing polyolefins and the catalyst used therein, which comprises a mixture of components: a low valency halogen compound of a transition metal selected from the group consisting of titanium and vanadium, a specific organoaluminum compound of the formula $RAlX_nF_{2-n}$ and advantageously at least one allylether specified in the claims.

---

This invention relates to a process for preparing polyolefins and to the catalyst used therein, the process being that in which alpha-olefins of not less than 3 carbon atoms are etiher polymerized or copolymerized, or said alpha-olefins are copolymerized with ethylene, in the presence of a catalyst of new combination.

More particularly, the invention relates to a process for preparing polyolefins which is characterized in that alpha-olefins of not less than 3 carbon atoms, preferably $C_3$–$C_7$ alpha-olefins, are either polymerized or copolymerized, or said alpha-olefins are copolymerized with ethylene, in the presence of a catalyst comprising a mixture of components (a) a low valency halogen compound of a transition metal selected from the group consisting of titanium and vanadium, and (b) an organoaluminum compound of the formula $$RAlX_nF_{2-n}$$

wherein R is selected from the group consisting of hydrogen, alkyl, preferably $C_1$–$C_7$ alkyl, and aryl, preferably phenyl, and tolyl, X is selected from the group consisting of chlorine, bromine and iodine and $n$ is a number having value of $0 \leq n \leq 1$.

As regards the polymerization catalysts of alpha-olefins, a very great number of proposals have been made in the past in connection with their improvement. And in view of their possession of merits as well as demerits with respect to such as the ease or difficulty of their preparation, the magnitude of their polymerization activity, ease or difficulty of controlling the polymerization operation, the existence or nonexistence of limitations as to the class of the material alpha-olefins, the properties of the resulting polymer and the adequacy or poorness of the reproducibility of the polymerization reaction, etc., much research relating to their improvement is still being continued. This invention also relates to such an improvement.

However, as already apparent from the very numerous proposals concerning the multicomponent combination catalysts for alpha-olefin polymerization that have been proposed to date, it frequently happens that one of certain catalyst constituent components which may have been useful in a certain combination, when substituted for one of certain constituent components in a different combination, would either be of no use at all or rather bring about only undesirable results. Hence, it is a well-known fact in the art of alpha-olefin polymerization that the substitution of a constituent component of a multicomponent combination catalyst brings about results that are completely unforeseeable.

According to this invention, it has been found that a catalyst system comprising a mixture of the aforesaid known component (a) and the aforesaid mixture component (b), the composition of which is new (presumed to be a reaction product), demonstrates superior catalytic activity in the polymerization or copolymerization of the alpha-olefins having 3 or more carbon atoms, and that improved results are also demonstrated in connection with such as the preparation of the catalyst, the polymerization operation, the properties of the resulting polymer and the reproducibility of the polymerization reaction.

The organoaluminum compound of the formula $RAlX_nF_{2-n}$, the aforesaid component (b), which is one of the components making up the invention catalyst, is unique in the point that a fluorine atom is bonded to an aluminum atom. In this case, the fluorine atom demonstrates a behavior which differs from that of the other halogen atoms. For instance, it is well-known that when alpha-olefins of not less than 3 carbon atoms are polymerized with a catalyst system comprising an organoaluminum compound of the formula 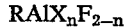 and a low valent compound of a transition metal polymers of high crystallinity cannot be obtained. However, the invention catalyst system containing an organoaluminum compound of the formula $RAlX_nF_{2-n}$ can become a catalyst with which polymers of high crystallinity can be obtained from alphaolefins of not less than 3 carbon atoms, under bonded conditions with the aforesaid component (a), as shown in the hereinafter given examples. Namely, that if at least one of the substituents in a dihalogen substituent product of an organoaluminum compound having two halogens bonded to aluminum is a fluorine atom the influence had on the activity and crystallinity in the polymerization of alpha-olefins under bonded conditions with the aforesaid component (a) would differ as a result of whether it is a fluorine atom or a chlorine atom is one of the surprising facts that we discovered.

The use of organoaluminum fluorides as one of the constituent components making up the catalyst for use in polymerizing alpha-olefins has been proposed in the past, but in these proposals the bonding conditions and/or the organoaluminum fluorides used differ from the make-up of the catalyst of this invention.

If some examples of these proposals are mentioned, they are as follows:

British patent specification No. 907,640 (corresponding to German Pat. 1,109,895) proposes an olefin polymerization catalyst in which it is indispensable that a transition metal halogen compound (which comprehends the aforesaid component (a) of the invention catalyst) and a mixture of a metal alkyl halide and a metal alkyl fluoride, in which the molar ratio of metal alkyl halide to metal alkyl fluoride is within the range of 9:1 to 1:1, are bonded and, as specific examples of said mixture, a mixture of an aluminum dialkyl chloride, such as $Al(C_2H_5)_2Cl$, and an aluminum dialkyl fluoride, such as $Al(C_2H_5)_2F$, is disclosed.

In these proposals the organoaluminum fluorides, such as R₂AlF, one of the components which are indispensable for making up the catalyst, is the aforesaid component (b), one of the components making up the catalyst of this invention, but the latter differs in the point that the aluminum has one organic substituent with the remaining two being substituted by fluorine atoms or a fluorine atom and a chlorine atom. And as apparent from the hereinafter given comparisons, the objects of this invention cannot be achieved even though R₂AlF is combined with the component (a) of the invention catalyst.

Again, there are also proposals which utilize metal fluorides as one of the constituent components of the catalyst. The bonding conditions of the catalyst components differ completely in the case of these proposals also. In addition, the compounds used differ from the component (b) of this invention.

Some examples of these proposals include the following. U.S. Pat. 3,125,558 discloses a catalyst which requires the bond of a three-component system comprising a halide of a transition metal (which comprehends the component (a) of the invention catalyst), an organoaluminum halide of the formula RAlX₂ or R₃Al₂X₃, where R is a $C_1$–$C_{12}$ alkyl, phenyl or benzyl and X is Cl, Br or I, and an alkali metal fluoride. In these proposals the metal fluorides used are of a structure differing entirely from the component (b) which constitute the invention catalyst and similarly the objects of this invention cannot be achieved by using these metal fluorides.

As the low valent halogen compound of a transition metal selected from the group consisting of titanium and vanadium, which is used as component (a) of the invention catalyst, that preferably used as the halogen compound of titanium is titanium trichloride, which is obtained by reducing titanium tetrachloride with a metal such as metallic aluminum and metallic silicon. In the halogen compound of vanadium, vanadium tetrachloride and vanadium trichloride can be used.

The other component (b) which along with the aforesaid component (a) make up the invention catalyst is a compound represented by the formula $$RAlX_nF_{2-n}$$

wherein R is selected from the group consisting of hydrogen, alkyl and aryl, X is selected from the group consisting of chlorine, bromine and iodine, $n$ includes the instance where $n=1$, in addition to the instance where $n$ is a number having a value of $0 \leq n \leq 1$.

In the formula, R can be made of the alkyl groups such as ethyl, propyl, isopropyl, butyl, isobutyl and isoamyl; the aryl groups such as phenyl and tolyl; and hydrogen. As X included are chlorine, bromine and iodine.

In this invention it is particularly preferred that R in the foregoing formula is a $C_2$–$C_4$ alkyl and X is chlorine.

On the other hand, as to the $n$ in the formula better results are had from the standpoint of the highness of the polymerization activity, the highness of the crystallinity of the resulting polymer, the excellence of the reaction reproducibility and the ease with which the reaction is controlled, when $n$ is a number $0 \leq n < 1$, preferably

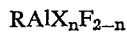

and still more preferably $0.3 < n < 0.7$, than when $n=1$.

The compound in which $0 \leq n < 1$ can be produced in various ways; for example, by such methods as (1) mixing RAlF₂ with RAlXF,
(2) mixing RAlF₂ with RAlX, and
(3) mixing RAlF₂, RAlXF and RAlX₂, wherein R and X are as hereinbefore defined, a suitable choice being made as to the mole ratio of the mixtures.

The compound of the formula RAlF₂ which are utilized for the preparation of the component (b) is (1)–(3), above, are readily prepared by (i) the reaction of R₃Al and BF₃ and
(ii) the reaction of R₂AlF and BF₃, wherein R is as hereinbefore defined, and can then be isolated in purity.

As known, RAlX₂ is not desirable as a catalyst for obtaining stereospecific polymers of alpha-olefins. Hence, the catalyst component of this invention is prepared by mixing as hereinabove described, it being preferred that the amount used of the RAlX₂ is kept as small as possible. Further, rather than introducing the olefin immediately after the mixing to carry out the polymerization reaction, it is preferred that the mixture be used after ageing it for a while.

Further, as the organoaluminum compounds of the formula RAlXF wherein $n=1$ in the formula of (b), above, included are the compounds in which R is an alkyl group such as ethyl, propyl, butyl, isopropyl, iso-butyl and iso-amyl, or an aryl group such as phenyl and tolyl, or hydrogen, and X is either chlorine, bromine or iodine. In this case, those in which R is an alkyl group, e.g. ethyl, propyl, iso-propyl or butyl, and X is chlorine are especially used with convenience.

These organoaluminum compounds wherein $n$ in the formula is 1 can be prepared in a number of ways. For example, they can be readily prepared by:

(4) the reaction of R₂AlX and BF₃,
(5) the reaction of R₂AlF and hydrogen halide, the preparation by these methods being preferred. It is also possible to utilize
(6) the reaction of RAlCl₂ and sodium fluoride, but since in this method the removal of the by-products is difficult, its use in the invention catalyst system is not to be desired. In (4)–(6), above, R and X are as hereinbefore defined.

When as the catalyst component (b) in this invention a compound in which $n=1$ is used, it is especially preferred that the component (a) is mixed with the component (b) which has been prepared in advance as described in (4)–(5), above. And it is not desirable, for example, to add boron trifluoride, hydrogen halide or sodium fluoride to a system consisting of a mixture of a low valent halogen compound of a transition metal of Groups IV or V of the Periodic table and the R₂AlX, R₂AlF and RAlCl₂ shown in (4)–(5) above.

On the other hand, when as the catalyst component (b) a compound in which the value of $n$ in the formula is $0 \leq n < 1$ is used, the restrictions as to the conditions of mixing is less than that of the above described case where $n=1$, but it is likewise preferred in this case also that the mixing of the components (a) and (b) is of those which have been separately prepared in advance.

When as the catalyst component (b) in the invention one is used in which the value of $n$ in the formula has a value $n > 1$ or $n=0$, it can be seen from the hereinafter given examples and comparisons that when the RAlF₂ used is one which $n=0$ the polymerization activity (absorption rate) of the alpha-olefin is exceeding great but the crystallinity of the resulting polymer is inferior. Further, there is a tendency that the polymerization activity declines as the proportion of chlorine increases, and when the value of $n$ becomes $n > 1$, the polymerization activity is no longer observable.

Further, the component (b) of the invention wherein the $n$ has been varied is not necessarily a single compound but comprehends those instances where the formula of the average composition of the reaction product is $RAlX_nF_{2-n}$.

A particularly desirable catalyst according to the invention is one comprising (a) a low valency halogen compound of transition metal selected from the group consisting of titanium and vanadium, (b)₁ a compound selected from the group consisting of alkyl-aluminum difluorides and arylaluminum difluorides of the formula R'AlF₂, where R' is alkyl or aryl, and (b)₂ a compound of the formula R'AlX₂, or R'AlXF, where R' is alkyl or aryl and X is either chlorine, bromine or iodine.

The mole ratio of catalyst components in the invention can be chosen from a broad range of a ratio of the transition metal halogen compound (a) to the $RAlX_nF_{2-n}$ (b) of 10:1 to 1:20, but convenient is a mole ratio 2:1 to 1:10.

The concentration of the catalyst can be chosen over broad range of from a very dilute state, say, 0.1 millimole per liter to a state where the mixture is not diluted at all.

Further, it is possible according to the invention to contemplate an increase in the polymerization activity and an improvement in the molecular weight distribution of the resulting polymer by adding a small amount of a known electron donor such as amines, ketones and ethers, which are known as being additives of the alpha-olefin polymerization catalysts.

As examples of such known electron donors, included are such as triethylamine, pyridine, piperidine, diethylene glycol dimethyl ether.

However, under the conditions of this invention wherein the catalyst components of (a) and (b) are combined, superior results are demonstrated by the allylethers. Namely, allylethers expressed by the general formula $CH_2=CH-CH_2-OR''$ (wherein R'' is an alkyl group of having 1 to 8 carbon atoms) are useful in bettering the reproducibility of the polymerization reaction, simplifying the control of the reaction conditions and producing stably polymers having much more improved stereospecificity.

For instance in a two-component catalyst system of only the aforesaid components (a) and (b), both the polymerization activity and the stereospecificity of the polymer change depending upon the $n$ chosen, but usually there is a greater tendency for the two to be contrariwise, and hence there are instances in which one must be sacrificed to a certain extent for improving the other. For example, when the value of $n$ is relatively small, there is a tendency that the stererospecificity becomes poor though the polymerization activity is great. However, if allylethers are added to such a catalyst system, the stereospecificity can be improved without impairment of the polymerization activity.

Such allylethers are compounds represented by the general formula $CH_2=CH-CH_2-OR''$ (wherein R'' is an alkyl group having 1 to 8 carbon atoms), and as such compounds, are included allylmethylether, allylethyether, allylpropylether, allylbutylether, allylamylether, allylhexylether, allyloctylether and the like. Among the foregoing allylethers, allylmethylether, allylethylether, allyl-n-propylether, allyl-n-butylether, allyl-iso-amylether, allyl-n-hexylether and allyl-n-octylether are particularly preferred from the point of the addition effect and the operation standpoint.

The order in which the allylethers are mixed with the catalyst components (a) and (b) can be varied suitably. For example, the component (a), component (b) and the allylethers may be mixed in the order given, or the component (b), i.e. $RAlX_nF_{2-n}$, and the allylethers may be first mixed and then the component (a), i.e. the halogen compound of titanium or vanadium, may be added. Further, it is preferred that after the mixture of the three components of (a), (b) and the allylether, or the two components of (b) and the allylether the mixture be aged in an atmosphere of nitrogen at a temperature of 50° to 180° C., with stirring.

The amount in which the allylethers are added can be chosen from a broad range of a mole ratio of the catalyst component (b), i.e. $RAlX_nF_{2-n}$ to said allylether of 20:1–1:10, preferably 20:1–1:2, but the preferred range is 10:1–1:2, especially 5:1–1:1.

In mixing the catalyst in this invention, a suitable diluent, for example, an inert hydrocarbon solvent such as pentane, hexane, heptane, kerosene, cyclohexane, benzene, xylene and toluene can be used, the use of which is to be preferred.

The invention catalyst is utilized to advantage for the polymerization of alpha-olefinic hydrocarbons, and in general the homopolymerization of alpha-olefins of not less than 3 carbon atoms, or the copolymerization of said alpha-olefins with ethylene, and also for the copolymerization of alpha-olefins of not less than 3 carbon atoms. And it is particularly suitable for obtaining stereospecific homo- and copolymers from the asymmetric alpha-olefinic hydrocarbons such as propylene, butene and styrene or the branched alpha-olefinic hydrocarbons such as 3-methylbutene-1, 3-methylhexane-1, 4-methylpentene-1 and 5-methylhexane-1.

In copolymerizing alpha-olefins with ethylene or other alpha-olefins, two or more classes of ethylene or alpha-olefins can be contacted in their mixed state with the catalyst to obtain random copolymers. For instance, an olefin mixture of propylene and ethylene in which the mole ratio of the mixture is 95:5 can be contacted with the invention catalyst to form a random copolymer. However, for obtaining highly crystalline polymers using a mixture of two or more classes of alpha-olefins, such as hereinabove described, it is preferred that the mixture ratio of the two classes alpha-olefins is that wherein one is less than 10 mole percent.

The block copolymerization technique can also be conveniently practiced for obtaining copolymers of two or more classes of alpha-olefins using the invention catalyst system. In carrying out the block copolymerization, the two or more classes if different alpha-olefins are contacted partially singly or partially in a mixed state, out the sequence of combination can be varied. For obtaining highly crystalline high polymers when obtaining polymers containing random copolymerized blocks of two or more alpha-olefins, it is preferred that the composition is such that the resulting polymeric chain is made up predominantly of one of the alpha-olefin monomers, i.e., the second alpha-olefin monomer units occupying less than 15 mol percent.

In practicing the invention any of the various methods of polymerization can be chosen. Namely, regardless of whether the batchwise or continuous procedure is chosen in carrying out any of the steps of mixing and ageing the catalyst and polymerizing the alpha-olefins, the operations can be carried out very readily without encountering any difficulties. Again, an inert hydrocarbon diluent may be used in carrying out the polymerization, or it can also be carried out by suspending the catalyst in the monomers without using any diluent at all.

As such diluents included are such, for example, as pentane, hexane, heptane, kerosene, cyclohexane, benzene, toluene and xylene.

The temperature and pressure at the time of the polymerization can be chosen as desired depending upon such as the class of monomer to be polymerized, the concentration of the catalyst and the degree of polymerization desired, but usually a temperature ranging from −20° to 100° C and a pressure ranging from reduced pressure conditions to a pressure on the order of 50 atmospheres, and preferably from 1 to 20 atmospheres, can be used. Needless to say, a presence higher than this can also be used.

Further, in carrying out the invention a chain-transfer agent such as gaseous hydrogen, alkyl halides and organic compounds having active hydrogen can be introduced into the polymerization system along with the olefin and contacted with the catalyst to suitably adjust the molecular weight of the resulting polymer. In this case, there is little, if any, decline in the crystallinity of the resulting polymer as a result of the introduction of the chain-transfer agent.

The following non-limitative examples will be given for illustrating several modes of practicing the invention.

EXAMPLE 1

Preparation of catalyst

Synthesis of $(C_2H_5)_2AlF$
$3(C_2H_5)_3Al+BF_3 \rightarrow 3(C_2H_5)_2AlF+B(C_2H_5)_3$ Dried boron trifluoride gas was slowly blown into a purified kerosene solution of triethylaluminum (concentration/mole per liter) under a stream of nitrogen at room temperature with stirring. After having fed 1/3 mole of boron trifluoride per mole of triethylaluminum, the stirring was continued for a further 60 minutes at room temperature. The kerosene and triethyl boron dissolved in the resulting reaction mixture was distilled off therefrom by reducing the pressure to 2 mm. Hg at room temperature. The resulting product analyzed as follows:

|  | Al | $C_2H_5$ [1] | F |
|---|---|---|---|
| Observed, percent | 25.89 | 55.76 | 17.96 |
| (Atomic ratio) [2] | (1.00) | (2.00) | (0.99) |
| Calculated, percent | 25.92 | 55.83 | 18.25 |

[1] Determined as ethane gas which evolves by decompositions of the sample with methanol.
[2] "Atomic" refers also to an alkyl group hereinafter.

EXAMPLE 2

Preparation of catalyst

Synthesis (a) of $C_2H_5AlClF$
$(C_2H_5)_2AlF + HCl \rightarrow C_2H_5AlClF + C_2H_6$ A purified n-butane solution (concentration 3.63 moles per liter) of the diethylaluminum fluoride obtained as in Example 1 was prepared under a stream of nitrogen. After cooling the solution with ice, an equimolar amount of dried hydrogen chloride gas was slowly blown into the solution at a constant rate with stirring. The reaction proceeded in response to the introduction of the hydrogen chloride gas and ethane gas was evolved stoichiometrically. The reaction solution was colorless and transparent and was slightly viscous. This product analyzed as follows:

|  | Al | $C_2H_5$ | Cl | F |
|---|---|---|---|---|
| Observed, percent | 24.38 | 28.84 | 32.21 | 16.89 |
| (Atomic ratio) | (1.00) | (0.99) | (1.01) | (0.98) |
| Calculated, percent | 24.42 | 26.30 | 32.09 | 17.19 |

EXAMPLE 3

Preparation of catalyst

Synthesis (b) of $C_2H_5AlClF$
$3(C_2H_5)_2AlCl + BF_3 \rightarrow 3C_2H_5AlClFB(C_2H_5)_3$ Ethylaluminum chlorofluoride was synthesized by following the same procedures described in Example 1 for preparing diethylaluminum fluoride, except that diethylaluminum chloride was used instead of triethylaluminum. The analytical values of this product in its kerosene solution state are as follows:

|  | Al | $C_2H_5$ | Cl | F |
|---|---|---|---|---|
| Observed, percent | 4.38 | 25.87 | 32.14 | 16.93 |
| (Atomic ratio) | (1.00) | (0.99) | (1.01) | (0.99) |
| Calculated, percent | 24.42 | 26.30 | 32.09 | 17.19 |

EXAMPLE 4

Preparation of catalyst

Synthesis of $C_2H_5AlF_2$
$3(C_2H_5)_3Al + 2BF_3 \rightarrow 3C_2H_5AlF_2 + 2B(C_2H_5)_3$ Dried boron trifluoride gas was slowly blown into an n-heptane solution of triethylaluminum (concentration 1 mole per liter) under a stream of nitrogen at room temperature with stirring. After having fed 2/3 mole of boron trifluoride per mole of triethylaluminum, the stirring was continued for 60 minutes at room temperature. The solvent heptane and triethyl boron dissolved in the resulting reaction mixture was distilled off therefrom by reducing the pressure to 2 mm. Hg at room temperature. The so-obtained product analyzed as follows:

Observed (percent): Al, 28.68; $C_2H_5$, 30.45; F, 36.0.
Calculated (percent): Al, 28.69; $C_2H_5$, 30.90; F, 41.4.

EXAMPLES 5–7 AND COMPARISONS 1–2

Illustrations of polymerization reactions

A 500 cc. glass polymerization vessel was charged with 250 cc. of purified kerosene and, after purging for one hour with nitrogen, was charged under a stream of nitrogen with an organoaluminum component indicated in Table I. This was followed by aging the charged component by raising the temperature to 70° C. for the prescribed time with stirring. Next, 1.5 grams of titanium trichloride (AA grade, product of Stauffer Chemical Company) was charged to the polymerization vessel, following which the polymerization reaction was carried out for 2 hours at normal atmospheric pressure by blowing in propylene gas at 70° C. After terminating the introduction of propylene, the reaction mixture was cooled to room temperature. After decomposing the catalyst with methanol, the resulting solid powdery polymer was separated by filtration, washed with methanol and dried under reduced pressure to yield a polypropylene powder.

The weight percentage of the hot heptane extraction residue of this polypropylene powder was obtained by extracting it with hot heptane using a Soxhlet extractor.

TABLE I

|  | $C_2H_5AlClF$ (cc.) | $C_2H_5AlCl_2$ (cc.) | $C_2H_5AlF_2$ (cc.) | $C_2H_5AlCl_nF_{2-n}$ value of $n$ | Aging time (hrs.) | Polypropylene | |
|---|---|---|---|---|---|---|---|
|  |  |  |  |  |  | Yield (percent) | Hot heptane extraction residue (percent by weight) |
| Example: |  |  |  |  |  |  |  |
| 5 |  |  | 0.53 | 0.37 | 2 | 63.0 | 91 |
| 6 | 3.13 | 0.065 | 0.57 | 0.447 | 2 | 60.0 | 93 |
| 7 | 1.67 | 0.17 | 0.633 | 0.50 | 2 | 55.0 | 95 |
| Comparison: |  |  |  |  |  |  |  |
| 1 | 10 | 0.1 |  | 1.1 | 2 | 15.0 |  |
| 2 | 5 | 0.51 |  | 1.5 | 2 | Trace |  |

COMPARISON 3

Illustration of a polymerization reaction presented by way of comparison

A 500 cc. glass polymerization vessel was charged with 250 cc. of purified kerosene and, after purging for one hour with nitrogen, 1.5 grams of titanium trichloride and 0.8 gram of diethylaluminum fluoride were added thereto. After raising the temperature to 70° C., propylene was introduced for one hour with stirring at this temperature. Since the reaction mixture became very viscous and the polymerization rate also declined, the introduction of the propylene was stopped, and switching over to nitrogen the reaction mixture was cooled to room temperature. The reaction mixture was then introduced into 1000 cc. of methanol to decompose the catalyst. After separating the resulting polymer from the mother liquor, the reaction mass was broken up, washed in methanol 5 times and dried under reduced pressure to yield 74 grams of polymer. When this polymer was extracted with hot heptane, 62% by weight was soluble in hot heptane and the amount of the hot heptane-insoluble highly crystalline polypropylene was only 38%.

EXAMPLES 8–13 AND COMPARISON 4

Illustrations of polymerization reactions

As the organoaluminum component, ethylaluminum difluoride and ethylaluminum dichloride were used. The amounts of their addition were varied and the influence of the proportion of the fluorine and chlorine atoms in the catalyst components was investigated, with the results shown in Table II. The other polymerization operations were carried out as in Example 5.

TABLE II

| | $C_2H_5AlF_2$ (g.) | $C_2H_5AlCl_2$ (cc.) | $RAlCl_nF_{2-n}$ value of $n$ | Aging time (hrs.) | Polypropylene Yield (g.) | Hot heptane extraction residue (percent by weight) |
|---|---|---|---|---|---|---|
| Example: | | | | | | |
| 8 | 0.97 | 0 | 0 | 0 | 83 | 66 |
| 9 | 0.83 | 0.13 | 0.25 | 2 | 65 | 89 |
| 10 | 0.71 | 0.21 | 0.43 | 2 | 52 | 93 |
| 11 | 0.60 | 0.39 | 0.75 | 2 | 41 | 95 |
| 12 | 0.52 | 0.51 | 1.06 | 2 | 36 | 95 |
| 13 | 0.23 | 0.77 | 1.5 | 2 | 0.6 | |
| Comparison: | | | | | | |
| 4 | 0 | 1.03 | 2.0 | | 0.0 | |

EXAMPLE 14

Illustration of a polymerization reaction

Except that as the material blown in a gas mixture of 95.5 mol percent of propylene, 3 mol percent of butene-1 and 1.5 mol percent of hydrogen was used, the polymerization was otherwise carried out as in Example 10 to yield 48 grams of white powdery polymer. The intrinsic viscosity ($\eta sp./c.$) of this polymer in Decalin at 135° C. was 2.3 The results of an infrared absorption analysis showed that it was a random copolymer of propylene and butene containing 2.5 mol percent of the butene. When this polymeric powder was melted and compression molded, it was found that the resulting molded board had superior transparency than that of propylene homopolymer.

EXAMPLE 15

Illustration of a polymerization reaction

To a closed type autoclave charged with 750 cc. of purified n-heptane were added under a nitrogen atmosphere 0.55 gram of ethylaluminum difluoride and 5 cc. of a kerosene solution of ethylaluminum chlorofluoride (concentration 1 mole per liter) followed by stirring for 2 hours at room temperature. After adding to this mixture 1.5 grams of titanium trichloride (AA grade, product of Stauffer Company) and also 300 cc. of hydrogen, the temperature was raised to 60°C. While stirring the mixture at 60° C. propylene was blown in for two hours at the rate of 40 liters per hour. After the introduction of propylene was terminated, the stirring was continued for 30 minutes. This was followed by introducing at a temperature of 60° C. ethylene at the rate of 20 liters per hour, followed by again introducing propylene for 2 hours at the rate of 40 liters per hour.

After the usual aftertreatment, 340 grams of white powdery polymer were obtained. The hot heptane extraction residue of this polymer was 91%, and its reduced viscosity measured in Decalin at 135° C. was 3.0. The result of an infrared absorption analysis showed that this polymer was crystalline block polymer containing 16% of ethylene units by weight.

EXAMPLE 16

Illustration of a polymerization reaction

Propylene was polymerized as in Example 15 except that 0.92 gram of isobutylaluminum difluoride and 0.21 cc. of ethylaluminum dichloride were used. The yield of the resulting polypropylene was 6.1 grams, and its hot heptane extraction residue was 94%.

EXAMPLE 17

Illustration of a polymerization reaction

A 500 cc. glass polymerization vessel was charged with 250 cc. of purified kerosene and was purged for one hour with nitrogen. Ten cc. of a kerosene solution of ethylaluminum chlorofluoride synthesized in accordance with the procedure hereinbefore described (concentration 1 mole per liter) were added under a nitrogen atmosphere followed by raising the temperature of the mixture to 70° C., at which the ageing was carried out for the prescribed time with stirring. This was followed by the addition of 1.5 grams of titanium trichloride (AA grade, product of Stauffer Company), after which the polymerization reaction was carried out for 2 hours at normal atmospheric pressure by blowing in propylene gas. After stopping the introduction of the propylene, the reaction mixture was cooled to room temperature. The catalyst was decomposed with methanol and the resulting solid powdery polymer was separated by filtration, washed with methanol and dried under reduced pressure to yield 35 grams of polypropylene powder.

The hot heptane extraction residue of this polypropylene extracted using a Soxhlet extractor was 94% by weight.

EXAMPLE 18

Illustration of a polymerization reaction

To a 500 cc. glass polymerization vessel was added under a nitrogen atmosphere a reaction mixture consisting of 250 cc. of kerosene, 0.01 mol of titanium trichloride (obtained by the reduction of titanium tetrachloride with hydrogen) and 5 cc. of 1 mol per liter solution of ethylaluminum chlorofluoride, following which 100 cc. of 4-methylpentene-1 were added after bringing the temperature of the reaction mixture to 50° C.

Nitrogen gas containing 10% each of butene-1 and hydrogen was passed slowly through the reaction mixture at the foregoing temperature while stirring was continued for 4 hours. Two hundred cc. of methanol was then added to terminate the polymerization reaction followed by separating the resulting polymer from the mother liquor, washing it throughly with methanol and drying under reduced pressure to yield 47 grams of a white powdery polymer.

The reduced viscosity ($\eta sp./c.$) of this polymer in Decalin at 135° C. was 2.5, and its hot heptane extraction residue was 80%. The results of an infrared absorption analysis showed that it was a crystalline polymer containing a random copolymer portion of butene and methylpentene.

EXAMPLE 19

Illustration of a polymerization reaction

A 500 cc. glass polymerization vessel was charged with 250 cc. of purified kerosene followed by purging with nitrogen for one hour. After adding 0.97 gram of ethylaluminum difluoride and stirring for 30 minutes to effect its perfect dissolution, 1.5 grams of titanium trichloride and 0.06 cc. of allyl ethyl ether were added, following which the temperature of the mixture was raised to 70° C. This was followed by the introduction of propylene gas for 2 hours. After stopping the introduction of propylene, the reaction mixture was cooled to room temperature. The catalyst was then decomposed with methanol, the resulting solid powdery polymer was separated by filtration, washed with methanol and thereafter dried under reduced pressure to obtain 55.3 grams of polypropylene powder. The hot heptane extraction residue of this polymer was 91%.

EXAMPLE 20

A 500 cc. glass polymerization vessel was charged with 250 cc. of purified kerosene followed by purging for one hour with nitrogen. This was followed by adding under a nitrogen atmosphere 10 cc. of a kerosene solution of ethylaluminum chlorofluoride prepared in accordance with the procedure hereinbefore described (concentration 1 mole per liter), following which the temperature was raised to 70° C. 1.5 grams of titanium trichloride (AA grade, product of Stauffer Company) and 0.113 cc. of allyl ethyl ether were added followed by blowing in of propylene gas at 70° C. to carry out the polymerization reaction for 2 hours at normal atmospheric pressure. After the introduction of propylene was stopped, the reaction mixture was cooled to room temperature. An aftertreatment was carried out as in Example 1, and 33 grams of polypropylene powder were obtained. When this polypropylene powder was extracted with hot heptane using a Soxhlet extractor, the hot heptane extraction residue was 97.3%.

EXAMPLE 21

When a mixture of 0.71 gram of ethylaluminum difluoride and 0.21 cc. of ethylaluminum dichloride (the composition as a whole becomes $C_2H_5AlCl_{0.43}F_{1.57}$) was used instead of 0.97 gram of ethylaluminum difluoride in Example 19, 48 grams of polypropylene powder whose hot heptane extraction residue was 96% were obtained.

EXAMPLE 22

A 500 cc. glass polymerization vessel was charged with 210 cc. of purified kerosene followed by purging for one hour with nitrogen. This was followed by the addition of 1.5 grams of titanium trichloride (AA grade, product of Stauffer Company), 40 cc. of a kerosene solution of separately synthesized $C_2H_5AlCl_{0.59}F_{1.41}$ (0.24 mole per liter) and 0.141 cc. of allyl ethyl ether and then raising the temperature to 70° C. Next, propylene was blown in for 2 hours at normal atmospheric pressure to carry out the polymerization reaction, after which the catalyst was decomposed with methanol and the resulting solid powdery polymer was separated by filtration. The powdery polymer atop the filter was further washed with methanol and then dried at reduced pressure to yield 42.5 grams of polypropylene whose hot heptane extraction residue was 97.8%. Further, 1.1 grams of a waxy polymer was obtained when the kerosene layer was concentrated.

Comparison 5

When 0.63 gram of di-n-butyl ether was used instead of allyl ethyl ether in Example 19, 70.4 grams of a powdery polymer whose hot heptane extraction residue was 76.0% was obtained. In addition, 9.2 grams of a waxy polymer were obtained from the kerosene layer.

EXAMPLE 23

When the polymerization reaction was carried out under identical conditions as in Example 22 by introducing a gas mixture of 95% by volume of propylene and 5% by volume of ethylene, 70 grams of a white powdery polymer were obtained after 5 hours of the polymerization reaction. The hot heptane extraction residue of this polymer was 92%.

EXAMPLE 24

A 500 cc. glass polymerization vessel was charged with 250 cc. of purified kerosene and then purged for one hour with nitrogen, after which 1.5 grams of titanium trichloride, 40 cc. of kerosene solution of separately synthesized $C_2H_5AlCl_{0.59}F_{1.41}$ (0.24 mole per liter) and 0.141 cc. of allyl ethyl ether were added. After raising the temperature of the mixture to 40° C., 35 grams (50 cc.) of 4-methylpentene-1 were added dropwise from a dropping funnel over a period of 20 minutes. After completion of the dropping, the polymerization reaction was carried out for 2 hours at the foregoing temperature. This was followed by cooling the reaction mixture to room temperature, decomposing the catalyst with methanol and filtration. Thus were obtained 28.2 grams of powdery 4-methylpentene-1 polymer whose hot heptane extraction residue was 94%. In addition, 0.3 grams of a waxy polymer was obtained by concentration of the butane layer of the filtrate.

We claim:

1. A process for preparing highly crystalline polyolefins which comprise polymerizing or copolymerizing alpha-olefins of not less than 3 carbon atoms, or copolymerizing said alpha-olefins with ethylene, in the presence of a catalyst consisting essentially of a mixture of
   (a) a low valency halide of a transition metal selected from the group consisting of titanium and vanadium, and
   (b) an organoaluminum compound of the formula $$RAlX_nF_{2-n}$$

where R is selected from the group consisting of hydrogen, alkyl and aryl, X is selected from the group consisting of chlorine, bromine and iodine and $n$ is a number having a value of $0.1 < n < 0.7$, the molar ratio of (a) to (b) being from 10:1–1:20.

2. The process according to claim 1 which comprises polymerizing or copolymerizing $C_3$-$C_7$ alpha-olefins, or copolymerizing said alpha-olefins with ethylene, in the presence of a catalyst consisting essentially of a mixture of
   (a) a low valency halide of a transition metal selected from the group consisting of titanium and vanadium, and
   (b) organoaluminum compound of the formula $$RAlX_nF_{2-n}$$

where R is selected from the group consisting of hydrogen, $C_1$-$C_7$ alkyl, phenyl and tolyl, X is selected from the group consisting of chlorine, bromine and iodine and $n$ is a number having a value of $0.1 < n < 0.7$.

3. The process according to claim 2 wherein $n$ in said formula is a number having a value of $0.3 < n < 0.7$.

4. The process according to claim 1 wherein said component of Formula (b) is a component obtained by mixing
   $(b)_1$ a compound of the formula $$R'AlF_2$$

wherein R' is selected from the group consisting of alkyl and aryl, and
   $(b)_2$ a compound selected from the group consisting of those of formulas $$R'AlX_2 \text{ and } R'AlXF$$

wherein R' is as above defined and X is as hereinbefore defined.

5. The process according to claim 1 wherein said catalyst has (c) at least one allylether represented by the general formula $$CH_2=CH-CH_2-OR''$$

wherein R'' is an alkyl group having 1 to 8 carbon atoms further incorporated therein, the molar ratio of (b) to (c) being from 20:1–1:10.

6. The process according to claim 5 wherein said allylether is a member selected from the group consisting of allylmethylether, allylethylether, allyl-n-propylether, allyl-n-butylether, allyl-isoamylether, allyl-n-hexylether and allyl-n-octylether.

7. A polymerization catalyst for alpha-olefins, which is used for polymerizing or copolymerizing aplha-olefins of not less than 3 carbon atoms, or copolymerizing said alpha-olefins with ethylene, said catalyst consisting essentially of a mixture of
   (a) a low valency halide of a transition metal selected from the group consisting of titanium and vanadium, and (b) an organoaluminum compound of the formula $$RAlX_nF_{2-n}$$

wherein R is selected from the group consisting of hydrogen, alkyl and aryl, X is selected from the group consisting of chlorine, bromine and iodine, and $n$ is a number having a value of $0.1<n<0.7$, the molar ratio of (a) to (b) being from 10:1–1:20.

8. A catalyst according to claim 7, said catalyst consisting essentially of a mixture of
(a) a low valency halide of a transition metal selected from the group consisting of titanium and vanadium, and
(b) an organoaluminum compound of the formula $$RAlX_nF_{2-n}$$

wherein R is selected from the group consisting of hydrogen $C_1$–$C_7$ alkyl, phenyl and tolyl, X is selected from the consisting of chlorine, bromine and iodine, and n is a number having a value of $$0.1<n<0.7$$

9. A catalyst according to claim 8 wherein the $n$ in said formula is a number having a value $0.3<n<0.7$.

10. A catalyst according to claim 7 wherein said component of Formula (b) is a component obtained by mixing.
$(b)_1$ a compound of the formula $$R'AlF_2$$

wherein R' is selected from the group consisting of alkyl and aryl, and $(b)_2$ a compound selected from the group of those having the formulas $$R'AlX_2 \text{ and } R'AlXF$$

wherein R' is as above defined and X is as hereinbefore defined.

11. The catalyst according to claim 7 wherein said catalyst has (c) at least one allylether represented by the formula $$CH_2=CH-CH_2-OR''$$

wherein R'' is an alkyl group having 1 to 8 carbon atoms further incorporated therein, the molar ratio of (b) to (c) being from 20:1–1:10.

12. The catalyst according to claim 11 wherein said allylether is a member selected from the group consisting of allylmethylether, allylethylether, allyl-n-propylether, allyl-n-butylether, allyl-iso-amylether, allyl-n-hexylether and allyl-n-octylether.

References Cited

UNITED STATES PATENTS 3,047,557  7/1962  Rust et al. _____ 260—93.7
3,156,681  11/1964  Kavesh et al. _____ 260—93.7

FOREIGN PATENTS 1,385,482  12/1964  France.

JOSEPH L. SCHOFER, Primary Examiner
E. J. SMITH, Assistant Examiner

U.S. Cl. X.R.

252—429; 260—878, 93.5, 93.7